United States Patent
Taylor et al.

(10) Patent No.: US 6,876,446 B2
(45) Date of Patent: Apr. 5, 2005

(54) BORE SCOPE WITH TEST LIGHT

(75) Inventors: Thomas Ronald Taylor, Clinton Township, MI (US); Derek John Trimble, Waterford, MI (US); Michael F. Banar, Warren, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/023,900

(22) Filed: Dec. 21, 2001

(65) Prior Publication Data

US 2003/0117617 A1 Jun. 26, 2003

(51) Int. Cl.[7] .............................................. G01N 21/00
(52) U.S. Cl. ................................. 356/241.1; 600/141
(58) Field of Search .......................... 356/241.1–241.6, 356/240.1; 250/227.26, 488.1, 461.1, 458.1; 128/4–6; 600/141; 438/65, 70; 358/98, 100, 400, 443

(56) References Cited

U.S. PATENT DOCUMENTS

| | | | | |
|---|---|---|---|---|
| 3,778,170 A | * | 12/1973 | Howell et al. ............ 356/241.4 |
| 4,298,312 A | * | 11/1981 | MacKenzie et al. ......... 415/118 |
| 4,330,169 A | * | 5/1982 | Kantor ........................ 359/369 |
| 4,686,963 A | * | 8/1987 | Cohen et al. ................ 600/141 |
| 4,822,154 A | * | 4/1989 | Oxford et al. ............... 359/367 |
| 4,825,259 A | * | 4/1989 | Berry, Jr. .................. 356/241.4 |
| 4,991,957 A | * | 2/1991 | Sakamoto et al. ........ 356/241.4 |
| 5,045,936 A | * | 9/1991 | Lobb et al. .................. 358/100 |
| 5,078,150 A | * | 1/1992 | Hara et al. ................... 600/476 |
| 5,096,292 A | * | 3/1992 | Sakamoto et al. ........ 356/241.4 |
| 5,115,136 A | * | 5/1992 | Tomasch .................. 250/461.1 |
| 5,170,775 A | * | 12/1992 | Tagami ..................... 356/241.4 |
| 5,200,838 A | * | 4/1993 | Nudelman et al. .......... 358/400 |
| 5,202,758 A | * | 4/1993 | Tamburrino .............. 250/461.1 |
| 5,278,642 A | * | 1/1994 | Danna et al. ................... 348/70 |
| 5,313,936 A | * | 5/1994 | Miyazaki et al. .............. 128/6 |
| 5,449,919 A | * | 9/1995 | Smart ....................... 250/461.1 |
| 5,617,498 A | * | 4/1997 | Cawood ..................... 385/117 |
| 5,703,377 A | * | 12/1997 | Ainsworth et al. .... 250/559.45 |
| 5,801,762 A | * | 9/1998 | Dianna et al. ................. 348/65 |
| 5,840,017 A | * | 11/1998 | Furusawa et al. ........... 600/160 |
| 5,986,752 A | * | 11/1999 | Morito et al. ............. 356/241.5 |
| 6,043,842 A | * | 3/2000 | Tomasch et al. ............ 348/164 |
| 6,412,334 B1 | * | 7/2002 | Kral et al. ....................... 73/40 |
| 6,464,633 B1 | * | 10/2002 | Hosoda et al. .............. 600/178 |

* cited by examiner

Primary Examiner—Gregory J. Toatley, Jr.
Assistant Examiner—Sang H. Nguyen
(74) Attorney, Agent, or Firm—Baker & Hostetler LLP

(57) ABSTRACT

A bore-scope device having a blue light source for leak detection and a white light source.

21 Claims, 1 Drawing Sheet

BORE SCOPE WITH TEST LIGHT

FIELD OF THE INVENTION

The present invention relates generally to bore-scopes. More particularly, the present invention relates to bore-scopes for use in detecting leaks.

BACKGROUND OF THE INVENTION

The use of computer aided design (CAD) software, and other modern design tools, has resulted in more compact designs for all types of mechanical equipment. By way of example, modem automobile engine design has produced engines that are more compact to fit in smaller engine compartments. Because of these compact designs, in order to service modem equipment, including automobile engines, it is frequently necessary to remove one or more components of the equipment in order to facilitate visual inspection of other components.

Tools and techniques have been developed to reduce the labor time required to perform these inspection activities because the cost to repair and service this equipment is dictated, in large part, by the labor costs. One such improved tool for making visual inspection includes the ProVision® inspection tool manufactured by SLi-Chicago Miniature Lamp Division of Wynnewood, Okla. This tool includes an eyepiece and light generating unit connected by a fiber optic cable encased in a flexible housing to a bore-scope. A white light is generated in the housing and radiated down the fiber optic cable to illuminate objects that are viewed through the eyepiece using the bore-scope.

Other inspection tools include the use of CCD cameras connected by a rigid or articulating wand, or a flexible fiber optic cable, to a bore-scope. White LEDs are used to illuminate objects to be viewed through the bore-scope. An example of this tool can be found at the web site www.gardco.com/snake.html To detect leaks in closed systems, such as air-conditioning, cooling, engine oil and transmission systems, fluorescent dyes have been developed for leak detection. These fluorescent dyes are used extensively in locating leaks of fluids, such as refrigerant, engine oil, transmission fluid, brake fluid, and gasoline, in automobile systems. To use these dyes, they are introduced into the system to be tested in order to mix with the fluid in the system. When the system is operated the fluorescent dye will seep out of any leaks in the system making it visible under a blue/black light.

The blue/black light used in detecting the leaking fluorescent dye is typically a drop light or flashlight fitted with a blue/black light bulb. By shining the blue/black light on the fluid conduits, any dye that has leaked out of the system will fluoresce making the leaks readily apparent. The leaking conduit can then be repaired. Notwithstanding the use of these leak dyes, identification of many leaks still require considerable labor effort in order to make the required visual inspection. For example, leaks in the heater core of an automobile cooling system typically requires that the dashboard be dismantled to make a visual inspection.

A device has been developed which utilizes a blue light LED at the end of a telescoping arm of a flashlight to allow the light to be brought in close proximity to systems to be leak tested in an automobile engine. The blue LED is selected to cause leak dye to fluoresce.

While these devices are improvements over prior tools and techniques, they do not solve the problem of permitting leaks to be detected in locations where there is no direct line of sight. A device is therefore required that will permit ultraviolet light to be delivered to objects in hidden locations and allow leaks to be viewed without having to dismantle portions of the equipment.

SUMMARY OF THE INVENTION

The foregoing need has been met to a great extent by the present invention, wherein in a first aspect, a bore-scope apparatus is provided which includes a bore-scope connected to a first end of a fiber optic cable. An eye piece and a source of ultraviolet and white light is provided at the second end of said fiber optic cable. The fiber optic cable is encased in a flexible arm. The ultraviolet light source is a blue LED.

In another aspect of the invention, a method of leak detection is provided which includes the steps of illuminating an object with an ultraviolet light. The object is viewed with a bore-scope through a fiber optic cable connected at a first end to the bore-scope and at a second end to an eye piece. The ultraviolet light is generated by a blue LED and the fiber optic cable is encased in a flexible housing.

In yet another aspect of the invention, a bore-scope apparatus is provided which includes means for illuminating an object with an ultraviolet light. Means are also provided for viewing the object with a bore-scope through a fiber optic cable connected at a first end to the bore-scope and at a second end to an eyepiece. The fiber optic cable is encased in a flexible housing and the ultraviolet light is generated by a blue LED.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purposes of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

DETAILED DESCRIPTION OF THE INVENTION

Figure 1:
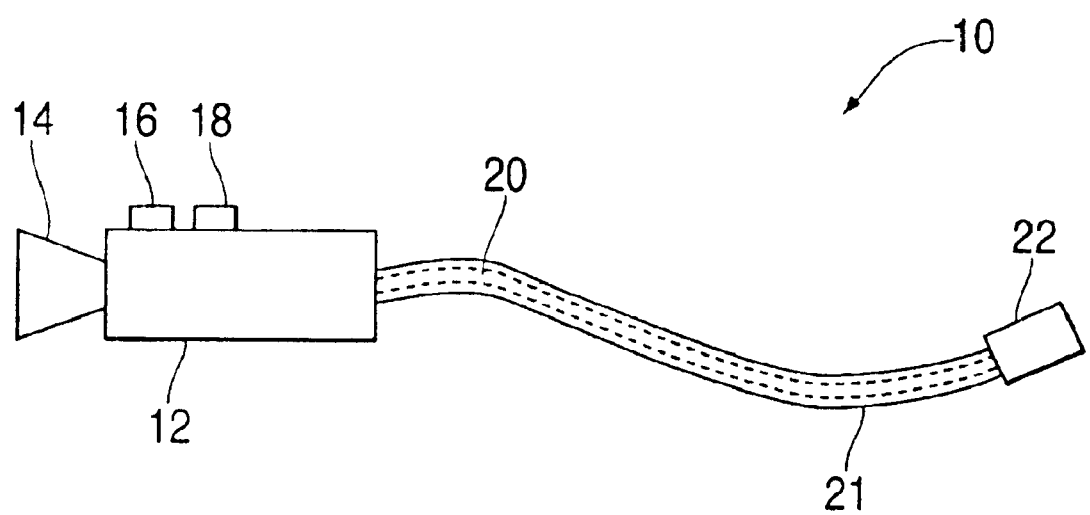
FIG. 1 is a block diagram illustration of a bore-scope in accordance with a preferred embodiment of the present invention.

Referring now to FIG. 1, there is shown a bore-scope device 10 in accordance with a first preferred embodiment of the invention. The bore-scope device 10 includes an eyepiece enclosure 12 that houses an eyepiece lens 14. The eyepiece enclosure 12 also includes a switch 16 for turning the white light source on and off and a separate switch 18 for turning the blue/black light source on and off.

A fiber optic cable unit 20 connects the eyepiece enclosure 12 to a bore-scope 22. The fiber optic cable unit 20 can be encased in a flexible protective shroud 21. In a preferred embodiment, the shroud is a flexible metal "goose-neck" casing. The goose-neck casing can be provided from a steel mesh or a spiral metal casing.

In order to operate the flexible viewing scope device 10, the flexible viewing scope 22 is positioned in front of objects 24 to be viewed. By depressing the switch 16 for the white light source, light is transmitted through the fiber optic cable unit 20 to the flexible viewing scope 22. The light then illuminates objects 24 in front of the flexible viewing scope 22. Light reflecting from the object 24 is then transmitted through the flexible viewing scope 22 to the eyepiece lens 14 through the fiber optic cable unit 20.

The fiber optic cable unit 20 may contain a fiber optic cable for transmitting images from the bore-scope 22 to the eyepiece 14. One or more separate fiber optic cables may be provided in the fiber optic cable unit 20 for delivering the white light from the bore-scope housing 12 to the bore-scope 22. Similarly, one or more fiber optic cables may be provided for delivering the blue/black light from the bore-scope housing 12 to the bore-scope 22. Alternatively, the white and blue light sources can be co-located with the bore-scope 22. Conductors can be provided in the fiber optic cable unit 20 to transmit power from a source of electricity in the bore-scope housing 12 to the light sources.

In order to accommodate for differences in the distance of objects to the flexible viewing scope, and thus differences in the focal length, the eyepiece lens is adjustable to bring objects 24 in front of the flexible viewing scope 22 into focus in the eyepiece lens 14. Focus of the eyepiece lens 14 can be done manually by rotating an outer cylindrical portion of the eyepiece lens having a threaded inner surface about an inner cylindrical portion of the eyepiece lens having a threaded outer portion. Focusing of the image can also be performed using autofocus drive systems. Such focus systems are well understood and need not be described in detail here.

In a preferred embodiment of the invention, the white light source is a white LED. It should be understood, however, that the white light source can be provided by any type of bulb that emits white light including halogen bulbs. Similarly, the user can depress the switch 18 for the blue/black light source to illuminate objects 24 in front of the flexible viewing scope 22 with the blue/black light. The light reflected from objects are transmitted through the fiber optic cable to the eyepiece 14.

While in a preferred embodiment the switches are push button switches, it should be readily recognized that any type of switch would be suitable including slide type switches, piezo electric switches, and the like.

The blue/black light source must emit the correct wavelength of light to cause leak dye to fluoresce. In order to provide a compact, hand-held, device, the blue/black light source must also be compact. It has been found that blue LEDs, part numbers N5PB300A, NSPB310A and NSPB320B5, manufactured by Nichia America Corporation, are all particularly suited for this use.

It should be understood that the bore-scope housing 12 will also contain a source of electricity for the white and blue/black light source and for powering the autofocus mechanism. The source of electricity in a preferred embodiment of the invention is batteries.

The bore-scope device 10 of the present invention is particularly useful in automobile repair and servicing. For example, in order to leak test the cooling system of an automobile, and particularly the heater core within an automobile dashboard, an appropriate fluorescent dye would be introduced into the system. Dyes suitable for this use are well known in the industry.

The bore-scope device can then be passed fed into the dashboard through a vent or a small hole in the heater core housing. The white light can be turned on and used as an aid in positioning the bore-scope 22. The white light can then be turned off and the blue LED can be turned on to illuminate portions of the heater core. Any dye that has leaked out through holes in the heater core will fluoresce under the light emitted by the blue LED and can be seen through the eyepiece lens 14.

Other applications of the bore-scope device of the present invention includes its use in industries other than the automotive industry such as heavy construction, implement, aircraft, recreational, and commercial heating and cooling. It should be understood that the foregoing are merely exemplary applications and it is not intended that the application of the bore-scope device be limited to these applications.

In an alternate embodiment the eyepiece can be replaced with a CCD camera and LCD color display screen. A blue LED, as described above, will be provided in the device with a switch for turning the blue LED on and off. Objects 24 in front of the flexible viewing scope will be displayed on the LCD screen and any leaks in the system being detected will be readily apparent.

Other embodiments of the invention include replacement of the goose-neck casing for the fiber optic cable with a rigid wand. Similarly, the bore-scope device can be provided as a kit having different detachable fiber optic extension pieces. For example, different length flexible and rigid fiber optic cables units can be provided in the kit.

The many features and advantages of the invention are apparent from the detailed specification, and thus, it is intended by the appended claims to cover all such features and advantages of the invention, which fall within the true spirits, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A flexible viewing scope apparatus, comprising:
    a flexible viewing scope connected to a first end of a fiber optic cable;
    a source of ultraviolet light disposed at a second end of said fiber optic cable;
    an eyepiece having an eyepiece lens connect to said source of ultraviolet light, wherein the eyepiece has a free end;
    wherein said fiber optic cable is encased in a flexible arm.

2. The apparatus of claim 1, further comprising a white light source provided at said second end of said fiber optic cable.

3. The apparatus of claim 2, wherein said eyepiece can be focused.

4. The apparatus of claim 3, further comprising a switch for tuning the ultraviolet light source on and off.

5. The apparatus of claim 1, wherein said ultraviolet light source is a blue LED.

6. The apparatus of claim 5, wherein said eyepiece can be focused.

7. The apparatus of claim 6, further comprising a switch for turning the ultraviolet light source on and off.

8. A method of leak detection, comprising the steps of:

providing an eyepiece having an eyepiece lens connected to a source of ultraviolet light, wherein the eyepiece has a free end and the ultraviolet light source is connected to an end of a fiber optic cable;

illuminating an object with the ultraviolet light;

viewing the-object through the eyepiece via a flexible viewing scope connected to another end of the fiber optic cable.

9. The method of claim 8, wherein said fiber optic cable is encased in a flexible housing.

10. The method of claim 9, further comprising the step of illuminating the object with a white light.

11. The method of claim 9, further comprising the step of adjusting the focus of the eyepiece.

12. The method of claim 8 wherein said ultraviolet light is generated by a blue LED.

13. The method of claim 12, wherein said fiber optic cable is encased in a flexible housing.

14. The method of claim 12, further comprising the step of illuminating the object with a white light.

15. A flexible viewing scope apparatus, comprising:

means for illuminating an object with an ultraviolet light;

an eyepiece having an eyepiece lens connected to the illuminating means, wherein the eyepiece has a free end and the illuminating means is connected to an end of the fiber optic cable;

means for viewing the object through the eyepiece having an eyepiece lens said viewing means connected to another end of the fiber optic cable.

16. The apparatus of claim 15, wherein said fiber optic cable is encased in a flexible housing.

17. The apparatus of claim 16, further comprising means for illuminating the object with a white light.

18. The apparatus of claim 16, further comprising means for adjusting the focus of the eye piece.

19. The apparatus of claim 15 wherein said ultraviolet light is generated by a blue LED.

20. The apparatus of claim 19, wherein said fiber optic cable is encased in a flexible housing.

21. The apparatus of claim 15, wherein the viewing means is a flexible viewing scope.

\* \* \* \* \*

UNITED STATES PATENT AND TRADEMARK OFFICE
CERTIFICATE OF CORRECTION

PATENT NO. : 6,876,446 B2
DATED : April 5, 2005
INVENTOR(S) : Thomas R. Taylor et al.

It is certified that error appears in the above-identified patent and that said Letters Patent is hereby corrected as shown below:

Column 4,
Line 56, please replace "connect" with -- connected --;

Column 5,
Line 13, please replace "the-object" with -- the object --;

Column 6,
Line 10, please replace "an eyepiece lens" with -- an eyepiece lens, --;
Line 17, please replace "eye piece" with -- eyepiece --.

Signed and Sealed this

Thirty-first Day of May, 2005

JON W. DUDAS
*Director of the United States Patent and Trademark Office*